United States Patent
Ge et al.

(10) Patent No.: US 11,891,466 B2
(45) Date of Patent: Feb. 6, 2024

(54) HEAT RESISTANT PMMA COPOLYMERS HAVING HIGH TEMPERATURE AND HIGH HUMIDITY ENVIRONMENTAL STABILITY FOR ELECTRONIC COMPONENT APPLICATIONS

(71) Applicant: Trinseo Europe GmbH, Horgen (CH)

(72) Inventors: Jiaxin Jason Ge, Audubon, PA (US); Gary Hall, Oaklyn, NJ (US)

(73) Assignee: Trinseo Europe GmbH, Pfaeffikon (CH)

( * ) Notice: Subject to any disclaimer, the term of this patent is extended or adjusted under 35 U.S.C. 154(b) by 0 days.

(21) Appl. No.: 17/687,199

(22) Filed: Mar. 4, 2022

(65) Prior Publication Data

US 2023/0279167 A1    Sep. 7, 2023

(51) Int. Cl.
C08F 220/14    (2006.01)

(52) U.S. Cl.
CPC ........ C08F 220/14 (2013.01); *C08F 2800/20* (2013.01)

(58) Field of Classification Search
CPC .................................................... C08F 220/14
See application file for complete search history.

(56) References Cited

U.S. PATENT DOCUMENTS

| | | | |
|---|---|---|---|
| 3,661,994 A | 5/1972 | Hwa et al. | |
| 3,843,753 A | 10/1974 | Owens | |
| 4,521,568 A | 6/1985 | Mori et al. | |
| 5,270,397 A | 12/1993 | Rhein et al. | |
| 7,101,930 B2 | 9/2006 | Martin et al. | |
| 7,795,348 B2 | 9/2010 | Noda et al. | |
| 8,299,168 B2 | 10/2012 | Münzmay et al. | |

(Continued)

FOREIGN PATENT DOCUMENTS

| CN | 1643008 A | 7/2005 |
|---|---|---|
| CN | 104011097 A | 8/2014 |

(Continued)

OTHER PUBLICATIONS

"Levels of Residual Monomer(s) in Acrylic Polymers," Methacrylate Producers Association, Inc., 2019. (Year: 2019).*

(Continued)

*Primary Examiner* — Catherine S Branch
(74) *Attorney, Agent, or Firm* — RatnerPrestia

(57) ABSTRACT

A high Tg acrylic copolymer includes methyl methacrylate with one or more high Tg hydrophobic monomers. The copolymer includes: a) at least one of tert-butyl cyclohexyl methacrylate, 3,3,5-trimethylcyclohexyl(meth)acrylate, tetrahydrofurfuryl methacrylate, or a mixture thereof; and b) (meth)acrylate monomer. The copolymer has the following properties: i) Tg of from 116° C. to 140° C.; ii) Mw of at least 110,000; and iii) a residual monomer level of less than 1.0 weight percent. The copolymer exhibits high heat resistance, high light transmission, low haze, low moisture uptake, excellent environmental stability, excellent high temperature thermal stability, and excellent mechanical properties, along with excellent UV resistance. The high molecular weight hydrophobic copolymer of the invention has the excellent environmental stability required for electronic components in automotive, displays, smartphones, photovoltaics, and others.

25 Claims, 1 Drawing Sheet

(56) References Cited

U.S. PATENT DOCUMENTS

| | | |
|---|---|---|
| 9,546,266 B2 | 1/2017 | Hanley et al. |
| 9,546,268 B2 | 1/2017 | Boutilier et al. |
| 9,725,548 B2 | 8/2017 | Boday et al. |
| 10,043,930 B2 | 8/2018 | Lefebvre et al. |
| 2007/0055017 A1 | 3/2007 | Schultes et al. |
| 2009/0074695 A1 | 3/2009 | Mahe et al. |
| 2015/0038634 A1 | 2/2015 | Sun et al. |
| 2015/0044161 A1 | 2/2015 | Chuang et al. |
| 2017/0298217 A1 | 10/2017 | Doessel et al. |
| 2018/0362688 A1 | 12/2018 | Bourrigaud et al. |

FOREIGN PATENT DOCUMENTS

| | | | |
|---|---|---|---|
| CN | 105209548 | A | 12/2015 |
| EP | 2789634 | A1 | 10/2014 |
| JP | 02233710 | A | 9/1990 |
| JP | 2002161112 | A | 6/2002 |
| JP | 2014040553 | A | 3/2014 |
| JP | 2014205853 | A | 10/2014 |
| KR | 20170004719 | A | 1/2017 |
| WO | 8906248 | A1 | 7/1989 |
| WO | 2014054543 | A1 | 4/2014 |
| WO | 2018152522 | A1 | 8/2018 |
| WO | 2018152541 | A1 | 8/2018 |
| WO | 2020206108 | A1 | 10/2020 |
| WO | 2020206113 | A1 | 10/2020 |

OTHER PUBLICATIONS

Chinese Office Action for Chinese Application No. 202080026085.4, dated Oct. 28, 2022 with translation, 18 pages.
Extended European Search Report for Application No. 20784709.6, dated Dec. 21, 2022, 7 pages.
Extended European Search Report for Application No. 20783818.6, dated Dec. 21, 2002, 7 pages.
International Search Report and Written Opinion for International Application No. PCT/US20/26370, dated Jun. 30, 2020, 7 pages.
Chinese Office Action for Chinese Application No. 202080026708.8, dated Nov. 2, 2022 with translation, 20 pages.
International Preliminary Report on Patentablity for International Application No. PCT/US2020/026377, dated Sep. 28, 2021, 6 pages.
International Preliminary Report on Patentability for International Application No. PCT/2020/026370, dated Sep. 28, 2021, 7 pages.
International Search Report and Written Opinion for International Application No. PCT/US2020/026377, dated Jun. 30, 2020, 6 pages.
International Search Report and Written Opinion for International Application No. PCT/US2023/014454, dated Apr. 1, 25, 2023, 12 pages.

* cited by examiner

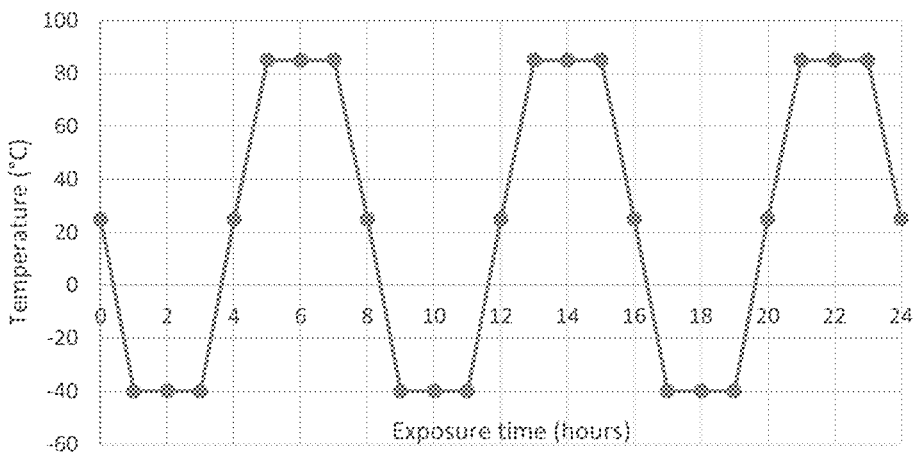

HEAT RESISTANT PMMA COPOLYMERS HAVING HIGH TEMPERATURE AND HIGH HUMIDITY ENVIRONMENTAL STABILITY FOR ELECTRONIC COMPONENT APPLICATIONS

FIELD OF THE INVENTION

The invention relates to high Tg acrylic copolymers of methyl methacrylate with one or more high Tg hydrophobic monomers. The copolymer exhibits high heat resistance, high light transmission, low haze, low moisture uptake, excellent environmental stability, excellent high temperature thermal stability, and excellent mechanical properties, along with excellent UV resistance. Importantly, the high molecular weight copolymer of the invention has the excellent environmental stability, which is beneficial for the electronic components in automotive, displays, smartphones, photovoltaics, and others as shown by passing a long term 600-1,000 hour 85° C./85% relative humidity test.

BACKGROUND OF THE INVENTION

Thermoplastic polymers and copolymers, especially (meth)acrylic polymers, have excellent characteristics such as transparency, mechanical properties and processability and are widely used in various fields such as automobile parts, electrical parts, industrial parts, optical materials, various parts of household electrical appliances, aesthetical parts, miscellaneous goods and the like.

High Tg acrylic polymers are especially useful in applications requiring a high optical clarity and high heat resistance. It is expected the market for high heat acrylic copolymers in automotive LED front inner lenses and thin wall parts will rapidly increase. In addition, hydrophobic high heat acrylic films are also used in LED/OLED displays.

High Tg acrylic copolymers, such as methyl methacrylate/methacrylic acid copolymer are described in US 2018-0362688.

U.S. Pat. No. 10,043,930 describes high Tg acrylic copolymers, using a variety of high Tg comonomers, for use in photovoltaic front sheets.

A problem with standard acrylic copolymers and products is the inability to pass long-term environmental stability testing such as 85° C./85% relative humidity (RH) test and humidity freeze tests, as may be required for automotive front inner lenses, automotive thin lenses, imaging lenses, solar panels and lenses, and new optical films in electronics. Most high Tg monomers, such as methacrylic acid are hydrophilic, and its copolymers are less resistant to moisture and moisture absorption. Passing an 85° C./85% RH environmental stability test is required for electronic applications by both UL and IEC.

High Tg, hydrophobic copolymers are described in WO 2020/206108 and WO 2020/206113, the entire disclosures of which are incorporated by reference herein for all purposes, describing copolymers of methyl methacrylate with hydrophobic tert-butyl cyclohexyl (meth)acrylate and/or 3,3,5-trimethyl cyclohexyl (meth)acrylate. These high Tg hydrophobic copolymers provide excellent high heat resistance, high light transmission, low haze, low moisture uptake, excellent environmental stability, excellent high temperature thermal stability, and excellent mechanical properties, along with excellent UV resistance.

Unfortunately, while having improved environmental stability, these copolymers could not pass a 600-1,000 hour 85° C./85 RH test, as required for use in electronic components in automotive displays, imaging lenses, smart phones, tablets, photovoltaics, and other electronic applications.

SUMMARY OF THE INVENTION

The inventors have now surprisingly solved this problem, and have produced a material capable of passing a 600-1,000 hour 85° C./85 RH environmental stability test, by increasing the molecular weight, decreasing the residual monomer, and maintaining sufficiently high Tg/Vicat softening temperature. Mechanical properties and high optical clarity are also maintained. Additionally, sagging and crazing, often seen in standard acrylics under severe environmental stress (e.g., high temperature/high humidity), are controlled to a low level, by the composition of the invention. According to some embodiments, the copolymer exhibits high heat resistance, high light transmission, low haze, low moisture uptake, excellent environmental stability, excellent high temperature thermal stability, and excellent mechanical properties, along with excellent UV resistance. Importantly, the high molecular weight copolymer of the invention has excellent environmental stability, which is beneficial for the for protection of electronic components in automotive application, displays, smartphones, photovoltaics, and other such applications as shown by passing a long term 1,000-hour 85° C./85% relative humidity test.

According to certain embodiments, the copolymer, or terpolymer is also useful in many applications, including, but not limited to automotive parts, lighting pipes, thin wall parts, optical lenses, stretched, tentered or extruded optical films, (co-)extruded sheets/profiles, thermo-formable sheets, injection molded parts, and composites.

The invention relates to a high Tg, optically clear, hydrophobic acrylic copolymer. The high Tg copolymer contains, as polymerized monomers:
a) from 0.2 to 20 weight percent, preferably from 0.5 to 10 weight percent of monomer units chosen from tert-butyl cyclohexyl methacrylate; 3,3,5-trimethylcyclohexyl(meth)acrylate; tetrahydrofurfuryl methacrylate or a mixture thereof;
b) from 80 to 99.8 weight percent (meth)acrylate monomer units;
and the acrylic copolymer has:
1) a Tg of from 116° C. to 145° C., preferably from 117° C. to 135° C., and more preferably from 119° C. to 130° C.,
2) a weight average molecular weight (Mw) of at least 110,000, preferably at least 120,000 g/mol, and more preferably greater than 130,000 g/mol, and
3) a residual monomer level of less than 1.2 weight percent, preferably less than 1.0 weight percent, more preferably less than 0.8 weight percent, and more preferably less than 0.5 weight percent.

Aspects of the invention relate to a copolymer that has a weight average molecular weight of at least 130,000 g/mol and is capable of passing a 1,000 hour 85° C./85% RH environmental stability test, with substantially no crazing and less than 4% sagging.

In an embodiment of the hydrophobic copolymer of the invention, the tert-butyl cyclohexyl methacrylate and/or 3,3,5-trimethylcyclohexyl(meth)acrylate monomer units have a trans/cis ratio of from 30%/70% to 98%/2%, preferably from 40%/60% to 85%/15%, and more preferably from 50%/50% to 75%/25%.

According to another embodiment, the hydrophobic acrylic polymer may contain, as polymerized monomer, at least 51 percent by weight of methyl methacrylate monomer units.

BRIEF DESCRIPTION OF THE DRAWING

The FIGURE shows a humidity freeze testing cycle for certain testing procedures.

DETAILED DESCRIPTION OF THE INVENTION

"Copolymer" as used herein means a polymer having two or more different monomer units, including copolymers, and polymers with three or more different monomers, such as terpolymers and tetrapolymers. "Polymer" is used to mean both homopolymer and copolymers. Polymers may be straight chain, branched, star, comb, block, or any other structure. The polymers may be homogeneous, heterogeneous, and may have a gradient distribution of co-monomer units. All references cited are incorporated herein by reference. As used herein, unless otherwise described, percent shall mean weight percent. Molecular weight is a weight average molecular weight as measured by gel permeation chromatography (GPC). In cases where the polymer contains some cross-linking, and GPC cannot be applied due to an insoluble polymer fraction, soluble fraction/gel fraction or soluble faction molecular weight after extraction from gel is used.

"Hydrophobic," as used herein means "water-repellent" as used herein means that the copolymer or compositions containing at least one "water-repellent monomer" are capable of passing 600-1000 hours under a 85° C./85% RH and/or humidity freeze environmental stability test. "Hydrophobic" as used herein means that the copolymers contain at least 0.05 wt. % of tert-butyl cyclohexyl methacrylate and/or 3,3,5-trimethylcyclohexyl(meth)acrylate and/or tetrahydrofurfuryl methacrylate monomers by weight of the copolymers. "Hydrophobic" as used with respect to compositions means compositions comprising, consisting of, or consisting essentially of at least one of these copolymers.

"(meth)acrylic" or "(meth)acrylate" as used herein denotes both the acrylate and the methacrylate.

"optically clear" as used herein means that the copolymers, or composition including them have transmissivity of 91% or more at wavelength of 560 nm and haze of 2.5% or less.

"High Tg monomer" as used herein refers to a monomer, that when polymerized, or co-polymerized produces a polymer having a Tg of greater than 116° C., and preferably greater than 120° C., and more preferably of greater than 130° C. The copolymers of the invention have high visible light transmission (i.e., the copolymers are optically clear), low water absorption, high heat resistance, sufficiently high molecular weight, excellent environmental stability (damp heat and/or humidity freeze), and excellent mechanical properties, along with excellent UV resistance.

Hydrophobic Comonomers

Hydrophobic comonomers reduce the water absorption and enhance the hydrophobicity, leading to excellent environmental stability. Examples of useful hydrophobic, high Tg monomers include, but are not limited to, tert-butyl cyclohexyl methacrylate as a specific blend range of trans/cis isomers, 3,3,5-trimethylcyclohexyl(meth)acrylate, and tetrahydrofurfuryl methacrylate, and blends thereof.

Tert-butyl cyclohexyl methacrylate

Tert-butyl cyclohexyl (meth)acrylate has the structural formulas below:

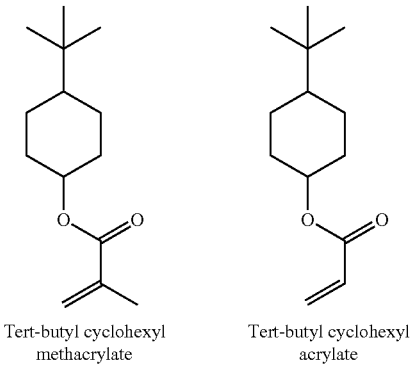 [SMILES: C=C(C)C(=O)OC1CCC(C(C)(C)C)CC1 ; C=CC(=O)OC1CCC(C(C)(C)C)CC1]

Tert-butyl cyclohexyl methacrylate

Tert-butyl cyclohexyl acrylate

The monomer is a mixture of the cis- and trans-forms, having a trans/cis ratio of between 30/70 and 98/2, preferably 40/60 to 85/15, and more preferably 50/50 to 75/25.

3,3,5-trimethylcyclohexyl(meth)acrylate 3,3,5-trimethylcyclohexyl(meth)acrylate is a mixture of the cis- and trans-forms and has the structural formulas below:

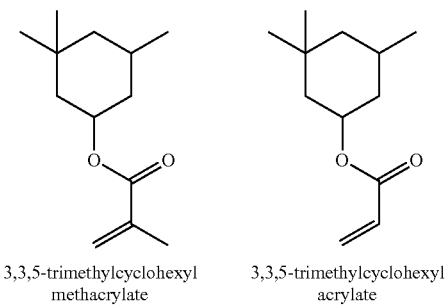

3,3,5-trimethylcyclohexyl methacrylate 3,3,5-trimethylcyclohexyl acrylate

The level of tert-butyl cyclohexyl methacrylate or 3,3,5-trimethylcyclohexyl methacrylate in the final copolymer generally ranges from 0.2-25 weight percent, and more preferably from 0.5 to 10 weight percent based on the total monomer units in the copolymer. It has been found that as little as 1 weight percent, and even 0.5 weight percent of tert-butyl cyclohexyl methacrylate, provides a copolymer having a hydrophobic character. The Tg of the copolymer of the invention is from 116° C. to 140° C.

Acrylic Monomers, MMA

One or more of the hydrophobic, high Tg monomers is copolymerized with one or more other monomers. In a preferred embodiment of the invention, the copolymer contains at least 50 weight percent of methyl methacrylate monomer units, preferably at least 70 weight percent and more preferably at least 80 weight percent methyl methacrylate monomer units make up the copolymer.

The copolymer of the invention, in addition to the hydrophobic, high Tg monomer(s), and methyl methacrylate, may include 0 to 49.5 weight percent of other acrylate and methacrylate monomers or other ethylenically unsaturated monomers, including but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture. In addition to carboxyl functionality, other functionality can be added to the high molecular weight acrylic process aid through functional comonomers, including epoxy (such as glycidyl methacrylate), hydroxyl, and anhydride functional groups. Functional monomer units (monomer units having a functional group) can be present at up to 70 weight percent of the acrylic polymer, preferably up to 50 weight percent.

In addition to the tert-butyl cyclohexyl methacrylate and 3,3,5-trimethylcyclohexyl (meth)acrylate, other high Tg monomers may optionally be present at levels of 0.2 to 25 weight percent, and more preferably from 0.5 to 10 weight percent. The other high Tg monomers may be hydrophilic, hydrophobic or have a neutral character, and include, but are not limited to methacrylic acid, acrylic acid, itaconic acid, alpha methyl styrene, maleic anhydride, maleimide, isobornyl methacrylate, norbornyl methacrylate, t-butyl methacrylate, cyclohexyl methacrylate, acrylamide and methacrylamide.

In one embodiment, a terpolymer of MMA/methacrylic acid and 3,3,5-trimethylcyclohexyl (meth)acrylate provides a useful terpolymer. Since the acid monomer is hydrophilic, the resulting copolymer is amphiphilic. Because the (meth) acrylic acids are hydrophilic, and its copolymers are not resistant to moisture and moisture absorption, use of these monomers should be limited to less than 1.2 weight percent, and preferably less than 1 weight percent and more preferably, if used at all, below 0.5 weight percent.

In one embodiment it was found that the hydrophobic effect of the tert-butyl cyclohexyl methacrylate and/or 3,3,5-trimethylcyclohexyl(meth)acrylate is strong enough to overcome the hydrophilic effect of hydrophilic comonomers used at lower levels, to produce an over-all hydrophobic copolymer.

Synthesis Process

The copolymers of the invention are obtained through melt polymerization, including but not limited to solution polymerization, emulsion polymerization, and suspension polymerization. The copolymer may be a random copolymer, a block copolymer or a gradient copolymer.

It was found that the process conditions can have a significant effect on the Tg of the copolymer. In general, solution polymerization of the copolymer was found to produce a higher level of syndiotacticity (~60%) and a higher Tg than those (~50%) in copolymers produced in a melt process. In a lab solution process run at about 65-75° C., the Tg of the copolymer was found to be about 124° C. In a pilot plant melt polymer process run at about 160° C., the Tg was found to be about 116° C. While not being bound by any particular theory, it is believed that the difference in copolymer Tg is related to the syndiotacticity percentage, which is higher at a lower process temperature. In addition, toluene used in solution polymerization may have different chemical environments.

Properties

The key properties of the copolymer of the invention to achieve excellent environmental performance is a balance of high glass transition temperature (Tg), high molecular weight and low residual monomer.

Glass Transition Temperature

The glass transition temperature (Tg) value of the acrylic copolymers is greater than 116° C., preferably greater than 118° C., more preferably greater than 120° C., and up to 140° C. In addition to high Tg requirement, a weight average molecular weight of greater than 130,000 g/mole is needed to pass the 85° C./85% RH test for a specific period of exposure time (e.g. 1000 hours) and/or humidity freeze cycling test (under −40° C. to 85° C./85% RH) for a specific period of exposure time (e.g. 600 hours). Some hydrophobic pMMA copolymers with the weight average molecular weight of 110,000 g/mole with a Tg of 116 C could provide a 85° C./85% RH result and/or humidity freeze cycling results of about 600 hours—which may be sufficient enough for some automotive electronic component applications Molecular Weight The weight average molecular weight of the hydrophobic copolymers is greater than 110,000 g/mole, preferably greater than 120,000 g/mole, more preferably greater than 130,000 g/mole, and much more preferably higher than 140,000 g/mole.

If the molecular weight is not high enough, the high Tg hydrophobic polymethyl methacrylate (PMMA) copolymer will not pass the environmental stability tests.

The maximum molecular weight is about 250,000 g/mole, and more preferably about 200,000 g/mole, for melt processability. However, for films cast from solution, the maximum molecular weight may be higher than 250,000 g/mole.

Low Residual Monomers

The level of residual monomer in the hydrophobic acrylic copolymer may be less than 1.5%, preferably less than 1.0%, more preferably less than 0.8%, and more preferably less than 0.5%. The residual monomer is removed during venting at the end of the polymerization process, or may be post-treated to drive the residual monomer level even lower.

Refractive Index

The hydrophobic high Tg copolymers of the invention, including co-, ter-, and tetrapolymers of the invention, possess a refractive index of 1.47-1.50 at the wavelength of 589 nm.

Trans/Cis Ratio

In the case of tert-butyl cyclohexyl (meth)acrylate, it was found that copolymers including this monomer as a polymerized monomer having a very high Tg (greater than 116° C., preferably greater than 118° C., more preferably greater than 120° C., and up to 140° C.) and a high trans isomer level (greater than 70% of the monomers incorporated into the copolymer), provide the best environmental stability performance. If Tg is high (>116° C.) and/or the level of trans isomer ratio in tert-butyl cyclohexyl (meth)acrylate is high (>60%), it provides better 85° C./85% RH performance.

Additives

The copolymer of the invention may optionally be blended with typical additives used in thermoplastics in an effective amount to form a copolymer composition. Useful additives include, but are not limited to, impact modifiers, block copolymers, fillers, surface modifying additives, antioxidants, UV screens, processing aids, fibers, lubricant agents, matting agents, heat stabilizers, flame retardants, synergists, pigments and other coloring agents.

The amount of filler and additives included in the polymer compositions may vary from 0 to 70 percent, 5 to 50 percent, and preferably 10 to 48 percent, based on the combined weight of polymer, additives and filler.

Impact Modifiers

Impact modifiers are in the composition to provide impact resistance, and film cutting/trimming resistance, and to improve water haze resistance and temperature haze resistance. Impact modifiers useful in the invention must be miscible, semi-miscible or compatible with the copolymer matrix, to ensure a homogeneous distribution of the impact modifier in the matrix copolymer. Useful impact modifiers may include block copolymers, graft copolymers, and core/shell impact modifiers. In one embodiment, for compositions with high optical clarity, the impact modifiers are refractive-index matched to the matrix polymer. By "refractive index matched" is meant the difference in refractive index between the impact modifiers and the matrix copolymer is plus or minus 0.02 or less, preferably less than 0.01, and most preferably less than 0.05.

In certain embodiments, the impact modifier comprises at least 50 weight percent of acrylic monomer units. The impact modifier may be present at a level of from 5 to 60, and more preferably from 10 to 50 weight percent, based on the total polymer and all additives. The level of impact modifier can be adjusted to meet the toughness needs for the end use of the composition. Core-shell impact modifiers are multi-stage, sequentially-produced polymer having a core/shell particle structure of at least two layers. In one embodiment, the core-shell impact modifier has a soft (elastomeric) core, and a hard shell (greater than a Tg of 20° C.). Preferentially, the core-shell modifier comprises at least three layers made of a hard core layer, one or more intermediate elastomeric layers, and a hard shell layer. Preferably the impact modifier is a core-shell structure, in which the shell contains at least 50 weight percent of methyl methacrylate monomer units. In one embodiment, the core-shell impact modifier has a hard core (with a Tg greater than 30° C., and more preferably greater than 50° C.).

Nanostrength® block copolymers from Altuglas which self-assemble on a nano-scale, provide for efficient impact modification, and have less of a detrimental effect on the viscosity and optical clarity of the composition. These block copolymers can be used as the sole impact modifier at levels of 3 to 60 weight percent, and preferably from 5 to 45 weight percent. They can also be efficiently used in combination with one or more types of core-shell impact modifiers. For example, 2 to 20 weight percent, and preferably 3 to 15 weight percent of Nanostrength® block copolymers, may be combined with 10 to 40 weight percent, and preferably 15 to 35 weight percent of traditional core-shell modifiers, and preferable hard core, core shell impact modifiers.

The impact modifiers of the invention can be melt compounded with the copolymer of the invention, by means known in the art.

Other Polymers

Other polymer additives combined with the copolymer of the invention could include polycarbonates, polyvinylidene fluoride, polyurethanes, polysulfones, polyamides, polyolefin including copolymers and terpolymers based on these polymers, and including linear, branched, block, and grafted polymer structures.

Examples of matting agents include, but are not limited to, cross-linked polymer particles of various geometries.

Antioxidants

In one embodiment, selected antioxidants may be used to improve the thermal stability of the resins at high temperature such as 240-270° C. and reduce the yellowing at high temperature. The loading of the antioxidants in the final copolymer composition is at a level of ~50 ppm to 3500 ppm, preferably about 100 ppm to about 2500 ppm based on the total weight of the composition. Non-limiting examples of useful antioxidants include sterically hindered phenols, organophosphites hindered amine light stabilizers (HALS), benzotriazoles, triazines, benzophenones, cyanoacrylates, and combinations thereof.

Performance

Environmental Stability is measured in two ways. The damp heat 85° C./85% RH test, and the humidity freeze test (−40° C. to 85° C./85% RH). Both of these tests are described below in the Example Section test methods. Passing the humidity freeze cycling (−40° C. to 85° C./85% RH) test and/or damp heat 85° C./85% RH test is required for LED front inner thick lenses and interior thin lenses in automotive applications, multilayer optical films, and polarization film in the electronic displays and smartphones, optical concentrated lenses in photovoltaics, and other uses. The injection molded hydrophobic high heat pMMA samples passed 600 hours under humidity freeze cycling tests (under −40° C. to 85° C./85% RH) and/or 85° C./85% RH without seeing crazing defects, preferably 800 hours under 85° C./85% RH, and more preferably 1000 hours under 85° C./85% RH, along with target sagging (<5%).

The hydrophobic high heat pMMA materials have exhibited excellent long-term UV resistance under ASTM G155-13 and SAE J2527-2017 testing protocols.

Further, optical films, and/or sheets including the copolymer of the invention possess the light transmission of higher than 91%, preferably higher than 92%, and an optical haze of less than 2.5%

In addition, the hydrophobic high heat pMMA copolymers have, under SAE J2527 testing protocols, exhibited long-term excellent UV resistance with delta E (color shift) <2 unit (which is not visible) measured with a X-Rite Color-i and high surface gloss retention (>95%) at the incident angle of 60 degrees measured with a BYK gloss meter.

Applications:

The high Tg hydrophobic copolymers of the invention pass high temperature/high humidity (and/or thermal cycling) tests required for electronic components in automotive, displays, smartphones, photovoltaics, and others. Impact film technologies can also be utilized in high heat LED diffusing sheets/films, digital printing with hydrophobic matt-finish surfaces, (window) profiles, and even capstock applications, automotive thin wall parts electronic components (automotive LED front thick lenses), and optical thin polarizers for LED/OLED displays, notebooks, as well as in solar electronics (lenses/panels/backsheets), and other applications.

Non-limiting aspects of the invention may be summarized as follows.

Aspect 1: An acrylic copolymer comprising, as polymerized monomers:
    a) from 0.2 to 20 weight percent, preferably from 0.5 to 10 weight percent of monomer units comprising at least one of tert-butyl cyclohexyl methacrylate; 3,3,5-trimethylcyclohexyl(meth)acrylate; tetrahydrofurfuryl methacrylate or a mixture thereof;
    b) from 80 to 99.8 weight percent (meth)acrylate monomer units;
    wherein said acrylic copolymer has:
        i) a Tg of from 116° C. to 145° C., preferably from 117° C. to 135° C., and more preferably from 119° C. to 130° C., ii) a weight average molecular weight (Mw) of at least 110,000, preferably at least 120,000 g/mol, and more preferably greater than 130,000 g/mol and iii) a residual monomer level of less than 1.2 weight percent, preferably less than 1.0 weight percent, more preferably less than 0.8 weight percent, and more preferably less than 0.5 weight percent.

Aspect 2: The high acrylic copolymer of Aspect 1, wherein said 3,3,5-trimethylcyclohexyl(meth)acrylate has a trans/cis ratio of from 30%/70% to 98%/2%, preferably from 40%/60% to 85%/15%, and more preferably from 50%/50% to 75%/25%.

Aspect 3. The acrylic copolymer of Aspect 1 or Aspect 2, wherein said copolymer comprises at least 51 percent by weight of methyl methacrylate monomer units.

Aspect 4: A composition comprising the acrylic copolymer of any of Aspects 1-3, wherein said acrylic copolymer has a weight average molecular weight of at least 110,000 g/mol and the composition is optically clear and passes a long-term humidity freeze of less than −40° C. to 85° C./85% RH environmental stability test for automotive electronic applications.

Aspect 5: A composition comprising the acrylic copolymer of any of Aspects 1-3, wherein said acrylic copolymer has a weight average molecular weight of at least 130,000 g/mol and the composition is optically clear and passes a 1,000 hour 85° C./85% RH test for photovoltaic applications.

Aspect 6: A composition comprising the acrylic copolymer of any of Aspects 1-3, wherein said composition is optically clear and has less than 5% sagging and preferably less than 4% sagging at 1,000 hours in an 85° C./85% RH test.

Aspect 7: A composition comprising the acrylic copolymer of any of Aspects 1-3, wherein said composition is optically clear and, in the form of a sheet or film, has minimal crazing visually after 1,000 hours in an 85° C./85% RH test for photovoltaic applications.

Aspect 8: A composition comprising the acrylic copolymer of any of Aspects 1-3, wherein said composition is optically clear and 3.2 mm thick samples of the composition have no visible stress crazing defects and sagging of less than 4% after 600 hours of exposure of −40° C. to 85° C./85% RH.

Aspect 9: A composition comprising the acrylic copolymer of any of Aspects 1-3, wherein said acrylic copolymer further comprises one or more additives at an effective amount, comprising at least one of impact modifiers, fillers, surface modifying additives, antioxidants, UV screens, processing aids, fibers, lubricant agents, matting agents, heat stabilizers, flame retardants, synergists, pigments or coloring agents.

Aspect 10: An article comprising the acrylic copolymer of any of Aspects 1-3, wherein said article is at least one of electronic components in automotive front inner thick lenses, automotive thin lenses, smartphones, imaging lenses, photovoltaics, high heat LED diffusing sheets/films, digital printing with hydrophobic surfaces, (window) profiles, capstock applications, automotive thin wall parts, electronic components, optical thin polarizers for LED/OLED displays, notebooks, and photovoltaic electronics (lenses/panels/backsheets).

EXAMPLES

Testing Methods:

Injection molded samples: In the testing below involving injection molded samples or plaques, the plaque sample size was molded at 45 mm (width)×67 mm (length)×3.2 mm (thickness).

Melt flow rate (MFR) measurement: Instron Ceast MF30 equipment was used for polymers in melt flow rate measurements. The die temperature was controlled at 230° C. while the loading cell weight was at 3.8 kg. The dried pellets were used near 20° C. below the $T_g$ over 8 hours.

Gel permeation chromatography (GPC): Waters Alliance 2695 and Waters Differential Refractometer 2410 were used to make polymer weight average molecular weight measurements. Columns were based on two PL Gel mixed C columns and a guard column (7.8 mm I.D.×30 cm, 5 µm). THF (HPLC grade) was selected as a solvent. Temperature was controlled at 35° C. Ten poly(methyl methacrylate) standards were used in the calibration, ranging in $M_p$ (peak molecular weight) from 550 to 1,677,000 g/mole.

Differential scanning calorimetry (DSC): The glass transition temperatures of acrylic polymers were measured at a heating rate of 10° C./minutes in $N_2$ using TA instruments Q2000 DSC, during the second heating. The first heating was used to heat the sample to 170° C. at a heating rate of 10° C./minute, then, the sample was cooled down to 0° C. at a cooling rate of 10° C./minute. The sample weight was controlled at 5-10 mg.

Thermogravimetry (TGA): The thermal decomposition temperatures of acrylic polymers were measured at a heating rate of 10° C./minute in $N_2$ using TA instruments Q5000 TGA. The sample weight was controlled at 5-10 mg. The samples were pre-dried under a vacuum oven at 100° C. overnight.

Total light transmission: The total light transmission was measured from film and/or plaque samples in a transmission mode using Perkin Elmer Lambda 950 with a 150 mm integrating sphere. The selected UV/Vis wavelength range was from 200 nm to 800 nm in the UV/Vis region.

Haze: Optical haze of clear film and/or plaque samples was measured using BYK HazeGard Plus under ASTM method D1003-00.

Tensile strength and elongation: The tensile strength, modulus and elongation of the tensile bars was evaluated using Instron Model 4202 at the crosshead speed of 5 mm/minute using ASTM D638-14 method after being preconditioned at 23° C./48 hours. The tensile bar was at 6 inches (15.24 cm) in length while the width was at 0.50 inches (1.27 cm). The sample thickness was at 0.125 inches (0.32 cm).

Refractive index: Refractive index of the polymer film was measured at three different wavelengths of 402 nm, 518 nm, and 636.5 nm using an optical prism coupler Metricon 2010 from Metricon Inc. while the refractive index was calculated at a selected wavelength of 589 nm.

NMR: Samples were prepared by dissolving approximately 200 mg of pellets in approximately 4 ml $CDCl_3$ in separate 10 mm NMR tubes for $^{13}C$ NMR. The $^1H$ spectra were acquired on the Bruker AV III HD 500 (11.07 T) spectrometer with a 5 mm $^1H/^{19}F/^{13}C$ TXO probe at 25° C. before and after derivatization of MAA. The $^{13}C$ spectra were acquired on the Bruker AV 400 (9.4 T) with a 10 mm BBO probe at 50° C.

Vicat softening temperatures: The samples were tested in Instron HV6M under 10N and 50N external forces using ASTM method D1525-17el. The sample heating rate was controlled at the speed of 50° C./hour. The injection molded samples were annealed at ~20° C. below the Tg value for 16 hours and were kept in a desiccator oven before testing.

Water absorption: The injection molded samples were immersed in a D. I. water bath (23° C.) using ASTM method D570-98 (2018). The water absorption value was measured based on the weight gain while the sample surfaces were cleaned up with dry tissues.

85/85 environmental stability tests: 85° C./85% RH environmental stability was evaluated at 85° C. under 85% relative humidity in Thermotron SE1000-6-6 under UL-1703. The tensile bar sample was made by injection molding with the sample length of 178 mm and the width of 12.7 mm. The sample thickness was at 3.2 mm. Stress crazing/cracking defects induced under damp heat 85° C./85% RH were visually inspected by naked eyes over a light box.

Sagging deformation under 85° C./85% RH: Sagging dimensional change was measured during 85° C./85% RH environmental stability at a different period of time up to 1000 hours. Sagging % was calculated from $(H_t-H_o)/H_o$, where $H_o$ stands for an initial height from the center portion and $H_t$ for a tested height. The span distance was controlled at 125 mm.

Humidity freeze tests: The humidity freeze environmental stability was evaluated under −40° C. to 85° C./85% relative humidity (RH) cycling tests in Thermotron SE1000-6-6. 3.2 mm thick tensile bars (or lenses) were made by injection molding with the sample length of 178 mm and the width of 12.7 mm. Stress crazing defects induced under humidity freeze tests (e.g. −40° C. to 85° C./85% RH) were visually inspected by naked eyes over a light box while the sagging deformation was also measured with a precision ruler, after 600 hours of exposure. The humidity freeze cycling schematic drawing is shown in the FIG.

Gas Chromatography (GC) Procedure: Approximately 0.2 grams of sample was extracted in approximately 5 grams methyl alcohol containing 1000 ppm butyl acetate. Samples were extracted using microwave-assisted extraction (MAE) with MAE method. [Parameters: T=140° C., Hold=30 min, P=300 psi, Power=200 watts] After extraction, samples were put through 0.2 μm PVDF filters into amber auto sampler vials for GC analysis. The gas chromatography parameters are shown below.

| Column Manufacturer/Type | Hewlett-Packard Innowax |
|---|---|
| Column Dimensions | 30 m × 0.25 mm × 0.25 μm $d_f$ |
| Injector | Auto; 1:25 split ratio |
| Carrier Gas | $H_2$ at 1.9 nL/min |
| Oven | 35° C. hold for 2 min |
|  | Ramp to 200° C. at 9° C./min; hold 6 min |
|  | Ramp to 250° C. at 33° C./min; hold 7 min |
| Injection Volume | 1 μL |

UV resistance tests: 3.2 mm thick pMMA plaques (2 inches×3 inches) (5.08 cm×7.62 cm) were tested in accelerated SAE J2527-2017 UV conditions in the UV cutoff wavelength of 290 nm (with boro-boro filters) in the exposure of a Xenon Arc lamp within an Atlas Ci5000 chamber. The irradiance at 340 nm was controlled at 0.55 W/m². The black panel temperature/humidity were controlled at 70° C./50% RH plus water spray in a lighted state while the black panel temperature was controlled at 38° C. along with water spray in a dark state.

Example 1 (Acrylic Copolymer with Tg of 118° C.)

This example demonstrates the preparation of a high molecular weight copolymer of methyl methacrylate and tert-butyl cyclohexyl methacrylate (t-BCHMA) from Sartomer). 9866 g of methyl methacrylate and 100 g of tert-butyl cyclohexyl methacrylate were charged in to a reaction vessel at approximately 0° C. under $N_2$ with a mechanical stirring speed of 100 rpm. In addition, Luperox® 531 (from Arkema) was used as an initiator at a level of 1.6 g while 25 g of n-dodecyl mercaptan (n-DDM from Aldrich) was used as a chain transfer agent, along with 1.0 g of di-tert-dodecyl disulfide (DtDDS from Arkema). The polymerization reaction occurred at 160° C. for 5 hours. When the conversion reached 50%, the residual monomers were removed through a venting system. The resulting polymer was passed through a single-screw extruder at a die temperature of 235° C. while the barrel temperatures were at 230-245° C. The melt stream went through a water bath before the pelletization. Then the polymer was pelletized into 3-4 mm long resin pellets and dried at 100° C. in a desiccator oven for 8 hours. The melt flow rate of the polymer obtained at the final retention was measured to be 1.02 g/10 minutes at 230° C. under 3.8 kg. The refractive index of the resulting polymer was measured at 1.491 at 589 nm.

The resulting polymer was confirmed using $^1H$ NMR to possess the composition of pMMA/tert-butyl cyclohexyl methacrylate (99.0/1.0 w/w) with a 60%/40% trans/cis isomer ratio in t-BCHMA. The syndiotacticity of the copolymer was determined at 52% from the chemical shift of 44.5 ppm using $^{13}C$ NMR while the isotacticity and atacticity were measured at 7% and 41% from 45.5 ppm and 45.0 ppm using $^{13}C$ NMR. The residual MMA and tert-butyl cyclohexyl methacrylate were detected at 0.25 wt. % and 0.23 wt. % in pMMA copolymers by using GC.

The glass transition temperature of the resin was measured to be 118° C. in $N_2$ using DSC at the heating rate of 10° C./minute while the Vicat temperature was detected at 119° C. under 10N. The weight average molecular weight Mw of the resin was measured as being 130,000 g/mole using GPC along with a Mw/Mn (polydispersity) value of 1.9. The light transmission from a 3.2 mm plaque was measured to be 92.3% at 560 nm using Lambda 950 while the haze was measured to be 0.3% using a hazemeter (Haze Gard Plus from BYK). The tensile modulus of the test sample was at 3.0 GPa while the tensile strength was at 75 MPa, along with a tensile elongation of 15%. Water absorption from 3.2 mm injection molded plaque was measured at 1.22 wt. % after 504 hours. 178 mm long tensile bar specimens (6 replicas) passed over 1000 hours under 85° C./85% RH in Thermotron SE 1000-6-6 without seeing obvious crazing defects, and the sagging deformation of 3.2% was measured at 1000 hours in this test. In addition, the tensile bars (3 replicas) also passed the humidity freeze tests (−40° C. to 85° C./85% RH) over 600 hours without having crazing defects, along with sagging of 2.8%. In addition, this hydrophobic pMMA copolymer exhibited excellent long-term UV resistance under SAE J2527. After the exposure at 5000 kJ/m², 3.2 mm sample plaque (2 inch×3 inch) (5.08 cm×7.62 cm) possessed very low color shifts (Delta E<1) along with the excellent surface gloss retention of >95% at the incidence angle of 60°.

Example 2 (Acrylic Copolymer with Tg of 118° C.)

This example demonstrates the preparation of a high molecular weight copolymer of methyl methacrylate and tert-butyl cyclohexyl methacrylate (from Sartomer). 9866 g of methyl methacrylate and 100 g of tert-butyl cyclohexyl methacrylate were charged in to a reaction vessel near 0° C. under $N_2$ with a mechanical stirring speed of 100 rpm. In addition, Luperox® 531 (from Arkema) was used as an initiator at a level of 1.68 g while 33.5 g of n-dodecyl mercaptan (n-DDM from Aldrich) was used as a chain transfer agent, along with 1.0 g of di-tert-dodecyl disulfide (DtDDS from Arkema). The polymerization reaction occurred at 160° C. for 5 hours. When the conversion reached 50%, the residual monomers were removed through a venting system. The resulting polymer was passed through a single-screw extruder at a die temperature of 235° C. while the barrel temperatures were at 230-245° C. The melt stream went through a water bath before the pelletization. Then the polymer was pelletized into 3-4 mm long resin pellets and dried at 100° C. in a desiccator oven for 8 hours. The melt flow rate of the polymer was measured to be 2.09 g/10 minutes at 230° C. under 3.8 kg. The refractive index of the resulting polymer was measured at 1.491 at 589 nm.

The resulting polymer was confirmed using $^1$H NMR to possess the composition of pMMA/tert-butyl cyclohexyl methacrylate (99.10/0.90 w/w) with a 56%/44% trans/cis isomer ratio in t-BCHMA. The syndiotacticity of the copolymer was determined at 51% from the chemical shift of 44.5 ppm using $^{13}$C NMR while the isotaticity and atacticity were measured at 7% and 42% from 45.5 ppm and 45.0 ppm using $^{13}$C NMR. The residual MMA and tert-butyl cyclohexyl methacrylate were detected at 0.25 wt. % and 0.25 wt. % in pMMA copolymers by using GC.

The glass transition temperature of the resin was measured to be 118° C. in N$_2$ using DSC at the heating rate of 10° C./minute while the Vicat temperature was detected at 119° C. under 10N. The weight average molecular weight Mw of the resin was measured as being 110,000 g/mole using GPC along with a Mw/Mn (polydispersity) value of 1.9. The light transmission from a 3.2 mm plaque was measured to be 92.3% at 560 nm using Lambda 950 while the haze was measured to be 0.3% using a hazemeter (Haze Gard Plus from BYK). The tensile modulus of the test sample was at 3.1 GPa while the tensile strength was at 74 MPa, along with a tensile elongation of 12%. Water absorption from 3 mm injection molded plaque was measured at 1.20 wt. % after 504 hours. Injection molded tensile bars (6 replicas) passed the testing at 600 hours under 85° C./85% RH without seeing obvious crazing while the crazing started to develop at 672 hours (average), along the sagging deformation of 3.3% at 1000 hours. In addition, the tensile bars (3 replicas) also passed the humidity freeze tests (−40° C. to 85° C./85% RH) over 600 hours without having crazing defects, along with sagging of 2.8%. Besides, this hydrophobic pMMA copolymer exhibited excellent long-term UV resistance under SAE J2527. After the exposure to 5000 kJ/m$^2$, 3.2 mm sample plaque (2 inches×3 inches) (5.08 cm×7.62 cm) possessed very low color shifts (Delta E<1) along with the excellent surface gloss retention of >95% at the incidence angle of 60°.

Example 3 (Acrylic Copolymer with Tg of 118° C.)

This example demonstrates the preparation of a high molecular weight copolymer of methyl methacrylate and tert-butyl cyclohexyl methacrylate (from Sartomer). 9866 g of methyl methacrylate and 100 g of tert-butyl cyclohexyl methacrylate were charged in to a reaction vessel near 0° C. under N$_2$ with a mechanical stirring speed of 100 rpm. In addition, Luperox® 531 (from Arkema) was used as an initiator at a level of 1.6 g while 24 g of n-dodecyl mercaptan (n-DDM from Aldrich) was used as a chain transfer agent, along with 1.0 g of di-tert-dodecyl disulfide (DtDDS from Arkema). The polymerization reaction occurred at 160° C. for 5 hours. When the conversion reached 50%, the residual monomers were removed through a venting system. The resulting polymer was passed through a single-screw extruder at a die temperature of 235° C. while the barrel temperatures were at 230-245° C. The melt stream went through a water bath before the pelletization. Then the polymer was pelletized into 3-4 mm long resin pellets and dried at 100° C. in a desiccator oven for 8 hours. The melt flow rate of the polymer was measured to be 0.98 g/10 minutes at 230° C. under 3.8 kg. The refractive index of the resulting polymer was measured at 1.491 at 589 nm.

The resulting polymer was confirmed using $^1$H NMR to possess the composition of pMMA/tert-butyl cyclohexyl methacrylate (99.02/0.98 w/w) with a 70%/30% trans/cis isomer ratio in t-BCHMA. The syndiotacticity of the copolymer was determined at 51% from the chemical shift of 44.5 ppm using $^{13}$C NMR while the isotaticity and atacticity were measured at 7% and 42% from 45.5 ppm and 45.0 ppm with $^{13}$C NMR. The residual MMA and tert-butyl cyclohexyl methacrylate were detected at 0.40 wt. % and 0.16 wt. % in pMMA copolymers by using GC.

The glass transition temperature of the resin was measured to be 117° C. in N$_2$ using DSC at the heating rate of 10° C./minute while the Vicat temperature was detected at 118° C. under 10N. The weight average molecular weight Mw of the resin was measured as being 135,000 g/mole using GPC along with a Mw/Mn (polydispersity) value of 1.9. The light transmission from a 3.2 mm plaque was measured to be 92.3% at 560 nm using Lambda 950 while the haze was measured to be 0.4% using a hazemeter (Haze Gard Plus from BYK). The tensile modulus of the test sample was at 3.1 GPa while the tensile strength was at 73 MPa, along with a tensile elongation of 16%. Water absorption from 3 mm injection molded plaque was measured at 1.24 wt. % after 504 hours. 178 mm tensile bars (6 replicas) passed over 1000 hours under 85° C./85% RH without seeing obvious crazing, and sagging of 3.4% at 1000 hours was measured. In addition, the tensile bars (3 replicas) also passed the humidity freeze tests (−40 to 85° C./85% RH) over 600 hours without having crazing defects, along with sagging of 2.8%. The hydrophobic pMMA copolymer exhibited excellent long-term UV resistance under SAE J2527. After the exposure to 5000 kJ/m$^2$, 3.2 mm sample plaque (2 inches×3 inches) (5.08 cm×7.62 cm) possessed very low color shifts (Delta E<1) along with the excellent surface gloss retention of >95% at the incidence angle of 60°.

Example 4 (Acrylic Copolymer with Tg of 120° C.)

This example demonstrates the preparation of a high molecular weight copolymer of methyl methacrylate and tert-butyl cyclohexyl methacrylate (from Sartomer) and also including a hydrophilic monomer (MAA) to provide an amphiphilic polymer. 9773 g of methyl methacrylate, 100 g methacrylic acid, and 100 g of tert-butyl cyclohexyl methacrylate were charged to a reaction vessel near 0° C. under N$_2$ with a mechanical stirring speed of 100 rpm. In addition, Luperox® 531 (from Arkema) was used as an initiator at a level of 1.6 g while 24 g of n-dodecyl mercaptan (n-DDM from Aldrich) was used as a chain transfer agent, along with 1.0 g of di-tert-dodecyl disulfide (DtDDS from Arkema). The polymerization reaction occurred at 160° C. for 5 hours. When the conversion reached 50%, the residual monomers were removed through a venting system. The resulting polymer was passed through a single-screw extruder at a die temperature of 235° C. while the barrel temperatures were at 230-245° C. The melt stream went through a water bath before the pelletization. Then the polymer was pelletized into 3-4 mm long resin pellets and dried at 100° C. in a desiccator oven for 8 hours. The melt flow rate of the polymer was measured to be 0.83 g/10 minutes at 230° C. under 3.8 kg. The refractive index of the resulting polymer was measured at 1.491 at 589 nm.

The resulting polymer was confirmed using $^1$H NMR and $^{13}$C NMR to possess the composition of pMMA/tert-butyl cyclohexyl methacrylate/methacrylic acid/anhydride (97.9/1.0/0.9/0.2 w/w) with a 71%/29% trans/cis isomer ratio in t-BCHMA. The syndiotacticity of the copolymer was determined at 51% from the chemical shift of 44.5 ppm using $^{13}$C NMR while the isotaticity and atacticity were measured at 7% and 42% from 45.5 ppm and 45.0 ppm using $^{13}$C NMR. The residual MMA, MAA and tert-butyl cyclohexyl methacrylate were detected at 0.42 wt. %, 0.10 wt %, and 0.16 wt. % respectively in pMMA terpolymers by using GC.

The glass transition temperature of the resin was measured to be 120° C. in $N_2$ using DSC at the heating rate of 10° C./minute while the Vicat temperature was detected at 119° C. under 10N. The weight average molecular weight Mw of the resin was measured as being 130,000 g/mole using GPC along with a Mw/Mn (polydispersity) value of 1.9. The light transmission from a 3.2 mm plaque was measured to be 92.3% at 560 nm using Lambda 950 while the haze was measured to be 0.3% using a hazemeter (Haze Gard Plus from BYK). The tensile modulus of the test sample was at 3.2 GPa while the tensile strength was at 76 MPa, along with a tensile elongation of 12%. Water absorption from an injection molded plaque was measured at 1.30 wt. % after 504 hours. Injection molded tensile bars (6 replicas) passed over 700 hours under 85° C./85% RH without seeing obvious crazing while fine crazing defects developed at 780 hours, along the sagging deformation of 3.7% at 1000 hours. In addition, the tensile bars (3 replicas) also passed the humidity freeze tests (−40 to 85° C./85% RH) over 600 hours without having crazing defects, along with sagging of 3.6%. The amphiphilic pMMA copolymer exhibited excellent long-term UV resistance under SAE J2527. After the exposure at 5000 kJ/m$^2$, 3.2 mm sample plaque (2 inches×3 inches) (5.08 cm×7.62 cm) possessed very low color shifts (Delta E<1) along with the excellent surface gloss retention of >95% at the incidence angle of 60°.

Example 5 (Acrylic Copolymer with Tg of 117° C.)

This example demonstrates the preparation of a high molecular weight copolymer of methyl methacrylate and tert-butyl cyclohexyl methacrylate (from Sartomer). 9773 g of methyl methacrylate, and 200 g of tert-butyl cyclohexyl methacrylate were charged in to a reaction vessel near 0° C. under $N_2$ with a mechanical stirring speed of 100 rpm. In addition, Luperox® 531 (from Arkema) was used as an initiator at a level of 1.6 g while 24 g of n-dodecyl mercaptan (n-DDM from Aldrich) was used as a chain transfer agent, along with 1.0 g of di-tert-dodecyl disulfide (DtDDS from Arkema). The polymerization reaction occurred at 160° C. for 5 hours. When the conversion reached 50%, the residual monomers were removed through a venting system. The resulting polymer was passed through a single-screw extruder at a die temperature of 235° C. while the barrel temperatures were at 230-245° C. The melt stream went through a water bath before the pelletization. Then the polymer was pelletized into 3-4 mm long resin pellets and dried at 100° C. in a desiccator oven for 8 hours. The melt flow rate of the polymer was measured to be 1.04 g/10 minutes at 230° C. under 3.8 kg. The refractive index of the resulting polymer was measured at 1.491 at 589 nm.

The resulting polymer was confirmed using $^1$H NMR to possess the composition of pMMA/tert-butyl cyclohexyl methacrylate (98.0/2.0 w/w) with a 70%/30% trans/cis isomer ratio in t-BCHMA. The syndiotacticity of the copolymer was determined at 51% from the chemical shift of 44.5 ppm using $^{13}$C NMR while the isotaticity and atacticity were measured at 7% and 42% from 45.5 ppm and 45.0 ppm using $^{13}$C NMR. The residual MMA and tert-butyl cyclohexyl methacrylate were detected at 0.43 wt. % and 0.35 wt. % in pMMA copolymers by using GC.

The glass transition temperature of the resin was measured to be 117° C. in $N_2$ using DSC at the heating rate of 10° C./minute while the Vicat temperature was detected at 118° C. under 10N. The weight average molecular weight Mw of the resin was measured as being 135,000 g/mole using GPC along with a Mw/Mn (polydispersity) value of 1.9. The light transmission from a 3.2 mm plaque was measured to be 92.3% at 560 nm using Lambda 950 while the haze was measured to be 0.4% using a hazemeter (Haze Gard Plus from BYK). The tensile modulus of the test sample was at 3.1 GPa while the tensile strength was at 73 MPa, along with a tensile elongation of 16%. Water absorption from injection molded plaque was measured at 1.23 wt. % after 504 hours. Injection molded tensile bars (6 replicas) passed over 800 hours under 85° C./85% RH without seeing obvious crazing while fine crazing developed at 900 hours (average), and the sagging deformation of 3.9% was measured at 1000 hours. In addition, the tensile bars (3 replicas) also passed the humidity freeze tests (−40 to 85° C./85% RH) over 600 hours without having crazing defects, along with sagging of 3.6%. In addition, this hydrophobic pMMA copolymer exhibited excellent long-term UV resistance under SAE J2527. After the exposure to 5000 kJ/m$^2$, 3.2 mm sample plaque (2"×3") possessed very low color shifts (Delta E<1) along with the excellent surface gloss retention of >95% at the incidence angle of 60°.

Example 6 (Acrylic Copolymer with Tg of 119° C.)

This example demonstrates the preparation of a high molecular weight copolymer of methyl methacrylate and tert-butyl cyclohexyl methacrylate (from Sartomer). 9916 g of methyl methacrylate and 50 g of tert-butyl cyclohexyl methacrylate were charged in to a reaction vessel near 0° C. under $N_2$ with a mechanical stirring speed of 100 rpm. In addition, Luperox® 531 (from Arkema) was used as an initiator at a level of 1.6 g while 27 g of n-dodecyl mercaptan (n-DDM from Aldrich) was used as a chain transfer agent, along with 1.0 g of di-tert-dodecyl disulfide (DtDDS from Arkema). The polymerization reaction occurred at 160° C. for 5 hours. When the conversion reached 50%, the residual monomers were removed through a venting system. The resulting polymer was passed through a single-screw extruder at a die temperature of 235° C. while the barrel temperatures were at 230-245° C. The melt stream went through a water bath before the pelletization. Then the polymer was pelletized into 3-4 mm long resin pellets and dried at 100° C. in a desiccator oven for 8 hours. The melt flow rate of the polymer was measured to be 1.32 g/10 minutes at 230° C. under 3.8 kg. The refractive index of the resulting polymer was measured at 1.491 at 589 nm.

The resulting polymer was confirmed using $^1$H NMR to possess the composition of pMMA/tert-butyl cyclohexyl methacrylate (99.4/0.6 w/w) with a 65%/35% trans/cis isomer ratio in t-BCHMA. The syndiotacticity of the copolymer was determined at 52% from the chemical shift of 44.5 ppm using $^{13}$C NMR while the isotaticity and atacticity were measured at 7% and 41% from 45.5 ppm and 45.0 ppm using $^{13}$NMR. The residual MMA and tert-butyl cyclohexyl methacrylate were detected at 0.24 wt. % and 0.10 wt. % in pMMA copolymers by using GC.

The glass transition temperature of the resin was measured to be 119° C. in $N_2$ using DSC at the heating rate of 10° C./minute while the Vicat temperature was detected at 118° C. under 10N. The weight average molecular weight Mw of the resin was measured as being 125,000 g/mole using GPC along with a Mw/Mn (polydispersity) value of 1.9. The light transmission from a 3.2 mm plaque was measured to be 92.3% at 560 nm using Lambda 950 while the haze was measured to be 0.5% using a hazemeter (Haze Gard Plus from BYK). The tensile modulus of the test sample was at 3.2 GPa while the tensile strength was at 72 MPa, along with a tensile elongation of 15%. Water absorption from 3 mm injection molded plaque was measured at 1.24 wt. % after 504 hours. Injection molded tensile bars (6 replicas) passed over 700 hours under 85° C./85% RH without seeing obvious crazing while fine crazing defects developed at 820 hours (average), along the sagging of 3.1% at 1000 hours. In addition, the tensile bars (3 replicas) also passed the humidity freeze tests (−40 to 85° C./85% RH) over 600 hours without having crazing defects, along with sagging of 1.5%. Besides, this hydrophobic pMMA copolymer exhibited excellent long-term UV resistance under SAE J2527. After the exposure at 5000 kJ/m2, 3.2 mm sample plaque (2 inches×3 inches) (5.08 cm×7.62 cm) possessed very low color shifts (Delta E<1) along with the excellent surface gloss retention of >95% at the incidence angle of 60°.

Example 7 (Compounded Acrylic Copolymer with Tg of 119° C.)

This example demonstrates the preparation of a high molecular weight copolymer of methyl methacrylate and tert-butyl cyclohexyl methacrylate (containing a 65% trans/35% cis isomer ratio) with melt flow rate of 1.3 g/10 minutes at 230° C. High Tg hydrophobic acrylic resins (Tg=119° C.) were compounded using a twin-screw extruder with the compounding speed of 50 lbs/hour (22.68 kg/hr) at a die temperature of 230° C. under a full vacuum. UV stabilizer was also added into the formulation through pre-blending in the compounding. The compounded acrylic pellets were cut through a water bath at ambient temperature and dried at 100° C.

TABLE 1

Composition of Example 7

| Component | Suppliers | Amount (parts) |
| --- | --- | --- |
| Acrylic copolymer from Example 6 | Arkema | 3997.6 |
| Irganox ® 1010 | BASF | 1.6 |
| Irgafos ® 126 | BASF | 0.8 |

The melt flow rate of the resulting composition was measured to be 1.30 g/10 minutes at 230° C. under 3.8 kg. The residual MMA and tert-butyl cyclohexyl methacrylate were detected at 0.19 wt. % and 0.02 wt. % in pMMA copolymers by using gas chromatography.

The glass transition temperature of the resin was measured to be 119° C. in $N_2$ using DSC at the heating rate of 10° C./minute while the Vicat temperature was detected at 119° C. under 10N. The weight average molecular weight Mw of the resin was measured as being 125,000 g/mole using GPC along with a Mw/Mn (polydispersity) value of 1.9. The light transmission from a 180 um film was measured to be 92.2% at 560 nm using Lambda 950 while the haze was measured to be 0.5% using a hazemeter (Haze Gard Plus from BYK). The tensile modulus of the test sample was 3.2 GPa while the tensile strength was 74 MPa, along with a tensile elongation of 11%. Water absorption from 3 mm injection molded plaque was measured at 1.24 wt. % after 504 hours. Injection molded tensile bars (6 replica) passed over 700 hours under 85° C./85% RH without seeing obvious crazing while fine crazing defects developed at 780 hours (average), along the sagging of 3.1% at 1000 hours. In addition, the tensile bars (3 replica) also passed the humidity freeze tests (−40 to 85° C./85% RH) over 600 hours without having crazing defects, along with sagging of 1.2%. This hydrophobic pMMA copolymer exhibited excellent long-term UV resistance under SAE J2527. After the exposure to 5000 kJ/m$^2$, 3.2 mm sample plaque (2 inches×3 inches) (5.08 cm×7.62 cm) possessed very low color shifts (Delta E<1) along with the excellent surface gloss retention of >95% at the incidence angle of 60°.

Comparative Example 1 (Acrylic Copolymer with Tg=121° C.)

This comparative example demonstrates the preparation of a high molecular weight copolymer of methyl methacrylate and methyl methacrylic acid (present at 5 wt % in the copolymer) with melt flow rate of 2.3 g/10 minutes at 230° C. The resulting polymer was confirmed using $^1$H NMR and $^{13}$C NMR to possess the composition of pMMA/MAA/anhydride (94.5/4.2/1.3 w/w/w). The syndiotacticity of the copolymer was determined as 51% from the chemical shift of 44.5 ppm using $^{13}$C NMR while the isotaticity and atacticity were measured at 7% and 42% from 45.5 ppm and 45.0 ppm using $^{13}$C NMR. The refractive index of the resulting polymer was measured at 1.494 at 589 nm.

The glass transition temperature of the resin was measured to be 121° C. in $N_2$ using DSC at the heating rate of 10° C./minute while the Vicat temperature was detected at 120° C. under 10N. The weight average molecular weight Mw of the resin was measured as being 82,000 g/mole using GPC along with a Mw/Mn (polydispersity) value of 2.0. The light transmission from a 3.2 mm plaque was measured to be 92.3% at 560 nm using Lambda 950 while the haze was measured to be 0.3% using a hazemeter (Haze Gard Plus from BYK). The tensile modulus of the test sample was at 3.4 GPa while the tensile strength was at 72 MPa, along with a tensile elongation of 6%. Water absorption from injection molded plaque was measured at 1.38 wt. % after 504 hours. Injection molded tensile bars (6 replicas) started to develop obvious crazing defects at 160 hours (average) under 85° C./85% RH, along the sagging deformation of 5.0% at 1000 hours. In addition, the tensile bars (3 replicas) also exhibited crazing defects at 400 hours and sagging at 4.5% in humidity freeze tests (−40 to 85° C./85% RH). This HT121-102 copolymer exhibited excellent long-term UV resistance under SAE J2527. After the exposure to 5000 kJ/m2, 3.2 mm sample plaque (2 inches×3 inches) (5.08 cm×7.62 cm) possessed very low color shifts (Delta E<1) along with the excellent surface gloss retention of >95% at the incidence angle of 60°.

Comparative Example 2 (with Tg=115° C.)

This example demonstrates the preparation of a high molecular weight copolymer of methyl methacrylate and ethyl acrylate (containing 0.6 wt % of ethyl acrylate) with melt flow rate of 3.7 g/10 minutes at 230° C. The resulting polymer was confirmed using $^1$H NMR to possess the composition of pMMA/EA (99.5/0.5 w/w). The syndiotacticity of the copolymer was determined at 51% from the chemical shift of 44.5 ppm using $^{13}$C NMR while the isotaticity and atacticity were measured at 7% and 42% from 45.5 ppm and 45.0 ppm with $^{13}$C NMR. The refractive index of the resulting polymer was measured at 1.491 at 589 nm.

The glass transition temperature of the resin was measured to be 115° C. in $N_2$ using DSC at the heating rate of 10° C./minute while the Vicat temperature was detected at 115° C. under 10N. The weight average molecular weight Mw of the resin was measured as being 86,000 g/mole using GPC along with a Mw/Mn (polydispersity) value of 1.9. The light transmission from a 3.2 mm plaque was measured to be 92.3% at 560 nm using Lambda 950 while the haze was measured to be 0.3% using a hazemeter (Haze Gard Plus from BYK). The tensile modulus of the test sample was at 3.0 GPa while the tensile strength was at 70 MPa, along with a tensile elongation of 7%. Water absorption from injection molded plaque was measured at 1.26 wt. % after 504 hours. Injection molded tensile bars (6 replicas) started to develop fine crazing defects at 480 hours (average) under 85° C./85% RH, along the sagging deformation of 7.0% at 1000 hours. In addition, the tensile bars (3 replicas) also exhibited obvious sagging of 6.5% at 600 hours in humidity freeze tests (−40 to 85° C./85% RH). This V825-100 copolymer exhibited excellent long-term UV resistance under SAE J2527. After the exposure to 5000 kJ/m$^2$, 3.2 mm sample plaque (2"×3") possessed very low color shifts (Delta E<1) along with the excellent surface gloss retention of >95% at the incidence angle of 60°.

Comparative Example 3 (Tg=114° C.)

This example demonstrates the preparation of a high molecular weight copolymer of methyl methacrylate and ethyl acrylate (containing 0.6 wt % ethyl acrylate) with melt flow rate of 1.7 g/10 minutes at 230° C. The resulting polymer was confirmed using $^1$H NMR to possess the composition of pMMA/EA (99.5/0.5 w/w). The syndiotacticity of the copolymer was determined at 51% from the chemical shift of 44.5 ppm using $^{13}$C NMR while the isotaticity and atacticity were measured at 7% and 42% from 45.5 ppm and 45.0 ppm using 13C NMR. The refractive index of the resulting polymer was measured at 1.491 at 589 nm.

The glass transition temperature of the resin was measured to be 114° C. in $N_2$ using DSC at the heating rate of 10° C./minute while the Vicat temperature was detected at 115° C. under 10N. The weight average molecular weight Mw of the resin was measured as being 105,000 g/mole using GPC along with a Mw/Mn (polydispersity) value of 1.9. The light transmission from a 3.2 mm plaque was measured to be 92.3% at 560 nm using Lambda 950 while the haze was measured to be 0.3% using a hazemeter (Haze Gard Plus from BYK). The tensile modulus of the test sample was at 3.0 GPa while the tensile strength was at 70 MPa, along with a tensile elongation of 12%. Water absorption from injection molded plaque was measured at 1.27 wt. after 504 hours. Injection molded tensile bars (6 replicas) started to develop fine crazing defects at 700 hours (average) under 85° C./85% RH, along the sagging deformation of 7.2% at 1000 hours. In addition, the tensile bars (3 replicas) also exhibited obvious sagging of 7.0% at 600 hours in humidity freeze tests (−40 to 85° C./85%/RH). This V826-100 copolymer exhibited excellent long-term UV resistance under SAE J2527. After the exposure to 5000 kJ/m$^2$, 3.2 mm sample plaque (2"×3") possessed very low color shifts (Delta E<1) along with the excellent surface gloss retention of >950/at the incidence angle of 60°.

TABLE 2 compositions and physical performance

| | Example 1 | Example 2 | Example 3 | Example 4 | Example 5 |
|---|---|---|---|---|---|
| Compositions of copolymers | PMMA:TBCHMA (99.0:1.0) | PMMA:TBCHMA (99.1:0.9) | PMMA:TBCHMA (99.02:0.98) | pMMA:TBCHMA/ MMA/anhydride (97.9/1.0/0.9/0.2) | PMMA:TBCHMA (98.0:2.0) |
| Trans/cis isomer ratio in copolymers | 60/40 | 56/44 | 70/30 | 71/29 | 70/30 |
| MFR (g/10 min.) | 1.02 | 2.10 | 0.98 | 0.83 | 1.04 |
| Tg (C.) | 118 | 118 | 117 | 120 | 117 |
| Vicat (C.) @10N | 119 | 119 | 118 | 119 | 118 |
| Mw | 130,000 | 110,000 | 135,000 | 130,000 | 135,000 |
| Mw/Mn | 1.9 | 1.9 | 1.9 | 1.9 | 1.9 |
| Tensile modulus (GPa) | 3.0 | 3.1 | 3.1 | 3.2 | 3.1 |
| Tensile strength (MPa) | 75 | 74 | 73 | 76 | 73 |
| Elongation (%) | 15 | 12 | 16 | 12 | 16 |
| Water absorption (%) at 504 hours | 1.22 | 1.20 | 1.24 | 1.30 | 1.23 |
| Residual monomers (%) | MMA: 0.25%; TBMCA: 0.23% | MMA: 0.25%; TBCMA: 0.25% | MMA: 0.40%; TBCMA: 0.16% | MMA: 0.42%; MAA: 0.10%; TBCMA: 0.16% | MMA: 0.43%; TBCMA: 0.35% |

TABLE 2-continued compositions and physical performance

| | Example 1 | Example 2 | Example 3 | Example 4 | Example 5 |
|---|---|---|---|---|---|
| Crazing time under 85/85 (hours) | No crazing at 1000 hours | Fine crazing at 672 hours | No crazing at 1000 hours | Fine crazing at 780 hours | Fine crazing at 900 hours |
| Sagging (%) under 85/85 | 3.2% | 3.3% | 3.4% | 3.7% | 3.9% |
| Crazing time under humidity freeze (hours) | No crazing at 600 hours; sagging of 2.8% | No crazing at 600 hours; sagging of 2.8% | No crazing at 600 hours; sagging of 2.8% | No crazing at 600 hours; sagging of 3.6% | No crazing at 600 hours; sagging of 3.6% |
| Delta E under SAE J2527 after 5000 kJ/m$^2$ | <1.0 | <1.0 | <1.0 | <1.0 | <1.0 |
| Gloss retention at 60° under SAE J2527 after 5000 kJ/m$^2$ | >95% | >95% | >95% | >95% | >95% |

TABLE 2 compositions and physical performance (continued)

| | Example 6 | Example 7 | Comp. ex. 1 | Comp. ex. 2 | Comp. ex. 3 |
|---|---|---|---|---|---|
| Compositions of copolymers | PMMA/TBCMA (99.4/0.6) | PMMA/TBCMA (99.4/0.6) | PMMA/MAA/ anhydride (94.5/4.2/1.3) | PMMA/EA (99.5/.0.5) | PMMA/EA (99.5/.0.5) |
| Trans/cis in TBCMA | 65/35 | 65/35 | | | |
| MFR (g/10 min.) | 1.32 | 1.30 | 2.3 | 3.7 | 1.7 |
| Tg (C.) | 119 | 119 | 121 | 115 | 114 |
| Vicat (° C.) @10N | 118 | 119 | 120 | 115 | 115 |
| Mw | 125,000 | 125,000 | 82,000 | 85,000 | 105,000 |
| Mw/Mn | 1.9 | 1.9 | 2.0 | 1.9 | 1.9 |
| Tensile modulus (GPa) | 3.2 | 3.2 | 3.4 | 3.0 | 3.0 |
| Tensile strength (MPa) | 72 | 74 | 72 | 70 | 72 |
| Elongation (%) | 15 | 11 | 6 | 7 | 12 |
| Water absorption (wt %) at 504 hours | 1.24 | 1.24 | 1.38 | 1.26 | 1.27 |
| Residual monomers (wt %) | MMA: 0.24%; TBCMA: 0.10% | MMA: 0.19%; TBCMA: 0.02% | MMA: 0.25%; MAA: 0.25% | MMA: 0.20%; EA: 0.10% | MMA: 0.25%; EA: 0.15% |
| Crazing time under 85/85 (hours) | Fine crazing at 820 hours | Fine crazing at 780 hours | Obvious crazing at 160 hours | Fine crazing at 480 hours | Fine crazing at 700 hours |
| Sagging (%) under 85/85 | 3.9% | 3.1% | 5.0% | 7.0% | 7.2% |
| Crazing time under humidity freeze (hours) | No crazing at 600 hours; sagging of 1.5% | No crazing at 600 hours; sagging of 1.2% | Crazing at 400 hours; sagging of 4.5% | No Crazing at 600 hours; sagging of 6.5% | No Crazing at 600 hours; sagging of 7.0% |
| Delta E under SAE J2527 after 5000 kJ/m$^2$ | <1.0 | <1.0 | <1.0 | <1.0 | <1.0 |
| Gloss retention at 60° under SAE J2527 after 5000 kJ/m$^2$ | >95% | >95% | >95% | >95% | >95% |

What is claimed is:

1. An acrylic copolymer comprising, as polymerized monomers:
   a) from 0.2 to 20 weight percent of monomer units comprising at least one of tert-butyl cyclohexyl methacrylate; 3,3,5-trimethylcyclohexyl(meth)acrylate; tetrahydrofurfuryl methacrylate or a mixture thereof;
   b) from 80 to 99.8 weight percent (meth)acrylate monomer units;
   wherein said acrylic copolymer has:
   i) a Tg of from 116° C. to 145° C.;
   ii) a weight average molecular weight (Mw) of at least 110,000; and
   iii) a residual monomer level of less than 1.2 weight percent;
   wherein a composition comprising the acrylic copolymer is optically clear and passes a long-term humidity freeze of less than −40° C. to 85° C./85% RH environmental stability test for automotive electronic applications.

2. The acrylic copolymer of claim 1, wherein said 3,3,5-trimethylcyclohexyl(meth)acrylate has a trans/cis ratio of from 30%/70% to 98%/2%.

3. The acrylic copolymer of claim 1, wherein said copolymer comprises at least 51 percent by weight of methyl methacrylate monomer units.

4. An acrylic copolymer comprising, as polymerized monomers:
   a) from 0.2 to 20 weight percent of monomer units comprising at least one of tert-butyl cyclohexyl methacrylate; 3,3,5-trimethylcyclohexyl(meth)acrylate; tetrahydrofurfuryl methacrylate or a mixture thereof;
   b) from 80 to 99.8 weight percent (meth)acrylate monomer units;
   wherein said acrylic copolymer has:
   i) a Tg of from 116° C. to 145° C.;
   ii) a weight average molecular weight (Mw) of at least 130,000; and
   iii) a residual monomer level of less than 1.2 weight percent;
   wherein a composition comprising the acrylic copolymer is optically clear and passes a 1,000 hour 85° C./85% RH test for photovoltaic applications.

5. An acrylic copolymer comprising, as polymerized monomers:
   a) from 0.2 to 20 weight percent of monomer units comprising at least one of tert-butyl cyclohexyl methacrylate; 3,3,5-trimethylcyclohexyl(meth)acrylate; tetrahydrofurfuryl methacrylate or a mixture thereof;
   b) from 80 to 99.8 weight percent (meth)acrylate monomer units;
   wherein said acrylic copolymer has:
   i) a Tg of from 116° C. to 145° C.;
   ii) a weight average molecular weight (Mw) of at least 110,000; and
   iii) a residual monomer level of less than 1.2 weight percent;
   wherein a composition comprising the acrylic copolymer is optically clear and has less than 5% sagging at 1,000 hours in an 85° C./85% RH test.

6. An acrylic copolymer comprising, as polymerized monomers:
   a) from 0.2 to 20 weight percent of monomer units comprising at least one of tert-butyl cyclohexyl methacrylate; 3,3,5-trimethylcyclohexyl(meth)acrylate; tetrahydrofurfuryl methacrylate or a mixture thereof;
   b) from 80 to 99.8 weight percent (meth)acrylate monomer units;
   wherein said acrylic copolymer has:
   i) a Tg of from 116° C. to 145° C.;
   ii) a weight average molecular weight (Mw) of at least 110,000; and
   iii) a residual monomer level of less than 1.2 weight percent;
   wherein a composition comprising the acrylic copolymer is optically clear and, in the form of a sheet or film, has minimal crazing visually after 1,000 hours in an 85° C./85% RH test for photovoltaic applications.

7. An acrylic copolymer comprising, as polymerized monomers:
   a) from 0.2 to 20 weight percent of monomer units comprising at least one of tert-butyl cyclohexyl methacrylate; 3,3,5-trimethylcyclohexyl(meth)acrylate; tetrahydrofurfuryl methacrylate or a mixture thereof;
   b) from 80 to 99.8 weight percent (meth)acrylate monomer units;
   wherein said acrylic copolymer has:
   i) a Tg of from 116° C. to 145° C.;
   ii) a weight average molecular weight (Mw) of at least 110,000; and
   iii) a residual monomer level of less than 1.2 weight percent;
   wherein a composition comprising the acrylic copolymer is optically clear and 3.2 mm thick samples of the composition have no visible stress crazing defects and sagging of less than 4% after 600 hours of exposure of −40° C. to 85° C./85% RH.

8. A composition comprising the acrylic copolymer of claim 1, wherein said acrylic copolymer further comprises one or more additives at an effective amount, comprising at least one of impact modifiers, fillers, surface modifying additives, antioxidants, UV screens, processing aids, fibers, lubricant agents, matting agents, heat stabilizers, flame retardants, synergists, pigments or coloring agents.

9. An article comprising the acrylic copolymer of claim 1, wherein said article is at least one of electronic components in automotive front inner thick lenses, automotive thin lenses, smartphones, imaging lenses, photovoltaics, high heat LED diffusing sheets/films, digital printing with hydrophobic surfaces, window profiles, capstock applications, automotive thin wall parts, electronic components, optical thin polarizers for LED/OLED displays, notebooks, and photovoltaic electronics.

10. The acrylic copolymer of claim 4, wherein said 3,3,5-trimethylcyclohexyl(meth)acrylate has a trans/cis ratio of from 30%/70% to 98%/2%.

11. The acrylic copolymer of claim 4, wherein said copolymer comprises at least 51 percent by weight of methyl methacrylate monomer units.

12. A composition comprising the acrylic copolymer of claim 4, wherein said acrylic copolymer further comprises one or more additives at an effective amount, comprising at least one of impact modifiers, fillers, surface modifying additives, antioxidants, UV screens, processing aids, fibers, lubricant agents, matting agents, heat stabilizers, flame retardants, synergists, pigments or coloring agents.

13. An article comprising the acrylic copolymer of claim 4, wherein said article is at least one of electronic components in automotive front inner thick lenses, automotive thin lenses, smartphones, imaging lenses, photovoltaics, high heat LED diffusing sheets/films, digital printing with hydrophobic surfaces, window profiles, capstock applications, automotive thin wall parts, electronic components, optical thin polarizers for LED/OLED displays, notebooks, and photovoltaic electronics.

14. The acrylic copolymer of claim 5, wherein said 3,3,5-trimethylcyclohexyl(meth)acrylate has a trans/cis ratio of from 30%/70% to 98%/2%.

15. The acrylic copolymer of claim 5, wherein said copolymer comprises at least 51 percent by weight of methyl methacrylate monomer units.

16. A composition comprising the acrylic copolymer of claim 5, wherein said acrylic copolymer further comprises one or more additives at an effective amount, comprising at least one of impact modifiers, fillers, surface modifying additives, antioxidants, UV screens, processing aids, fibers, lubricant agents, matting agents, heat stabilizers, flame retardants, synergists, pigments or coloring agents.

17. An article comprising the acrylic copolymer of claim 5, wherein said article is at least one of electronic components in automotive front inner thick lenses, automotive thin lenses, smartphones, imaging lenses, photovoltaics, high heat LED diffusing sheets/films, digital printing with hydrophobic surfaces, window profiles, capstock applications, automotive thin wall parts, electronic components, optical thin polarizers for LED/OLED displays, notebooks, and photovoltaic electronics.

18. The acrylic copolymer of claim 6, wherein said 3,3,5-trimethylcyclohexyl(meth)acrylate has a trans/cis ratio of from 30%/70% to 98%/2%.

19. The acrylic copolymer of claim 6, wherein said copolymer comprises at least 51 percent by weight of methyl methacrylate monomer units.

20. A composition comprising the acrylic copolymer of claim 6, wherein said acrylic copolymer further comprises one or more additives at an effective amount, comprising at least one of impact modifiers, fillers, surface modifying additives, antioxidants, UV screens, processing aids, fibers, lubricant agents, matting agents, heat stabilizers, flame retardants, synergists, pigments or coloring agents.

21. An article comprising the acrylic copolymer of claim 6, wherein said article is at least one of electronic components in automotive front inner thick lenses, automotive thin lenses, smartphones, imaging lenses, photovoltaics, high heat LED diffusing sheets/films, digital printing with hydrophobic surfaces, window profiles, capstock applications, automotive thin wall parts, electronic components, optical thin polarizers for LED/OLED displays, notebooks, and photovoltaic electronics.

22. The acrylic copolymer of claim 7, wherein said 3,3,5-trimethylcyclohexyl(meth)acrylate has a trans/cis ratio of from 30%/70% to 98%/2%.

23. The acrylic copolymer of claim 7, wherein said copolymer comprises at least 51 percent by weight of methyl methacrylate monomer units.

24. A composition comprising the acrylic copolymer of claim 7, wherein said acrylic copolymer further comprises one or more additives at an effective amount, comprising at least one of impact modifiers, fillers, surface modifying additives, antioxidants, UV screens, processing aids, fibers, lubricant agents, matting agents, heat stabilizers, flame retardants, synergists, pigments or coloring agents.

25. An article comprising the acrylic copolymer of claim 7, wherein said article is at least one of electronic components in automotive front inner thick lenses, automotive thin lenses, smartphones, imaging lenses, photovoltaics, high heat LED diffusing sheets/films, digital printing with hydrophobic surfaces, window profiles, capstock applications, automotive thin wall parts, electronic components, optical thin polarizers for LED/OLED displays, notebooks, and photovoltaic electronics.

* * * * *